US011656193B2

(12) United States Patent
Stein et al.

(10) Patent No.: US 11,656,193 B2
(45) Date of Patent: May 23, 2023

(54) SELF-CALIBRATING POLYMER NANO COMPOSITE (PNC) SENSING ELEMENT

(71) Applicants: Analog Devices International Unlimited Company, Limerick (IE); Analog Devices, Inc., Wilmington, MA (US)

(72) Inventors: Yosef Stein, Sharon, MA (US); Seth S. Kessler, Newton, MA (US); Haim Primo, Ganei Tikva (IL)

(73) Assignee: Analog Devices, Inc., Wilmington, MA (US)

(*) Notice: Subject to any disclaimer, the term of this patent is extended or adjusted under 35 U.S.C. 154(b) by 4 days.

(21) Appl. No.: 17/346,049

(22) Filed: Jun. 11, 2021

(65) Prior Publication Data

US 2021/0389265 A1 Dec. 16, 2021

Related U.S. Application Data

(60) Provisional application No. 63/038,551, filed on Jun. 12, 2020.

(51) Int. Cl.
*G01N 27/20* (2006.01)
(52) U.S. Cl.
CPC .................... *G01N 27/20* (2013.01)
(58) Field of Classification Search
CPC ....................................................... G01N 27/20
See application file for complete search history.

(56) References Cited

U.S. PATENT DOCUMENTS 4,326,164 A 4/1982 Victor
5,834,942 A 11/1998 De Angelis
(Continued)

FOREIGN PATENT DOCUMENTS

CA 2 864 817 A1 8/2013
CN 102037480 A 4/2011
(Continued)

OTHER PUBLICATIONS

International Search Report and Written Opinion dated Sep. 25, 2017 in connection with International Application No. PCT/US2017/036719.

(Continued)

*Primary Examiner* — Feba Pothen
(74) *Attorney, Agent, or Firm* — Wolf, Greenfield & Sacks, P.C.

(57) ABSTRACT

Aspects of the present application allow for measurement of a calibrated resistance for a resistive film in a sensing element, such that effects from contact resistance and background resistance drifts due to factors such as temperature, strain or aging can be reduced or eliminated. In some embodiments, by taking a plurality of two-terminal resistance measurements between various pairs of electrodes on a resistive film, a contact-resistance-independent resistance of a reference portion of the resistive film can be determined. Further, a contact-resistance-independent resistance of a sensing portion of the resistive film can be determined based on a plurality of two-terminal resistance measurements between pairs of electrodes. The resistance of the reference portion can be removed from the measured resistance of the sensing portion, such that variations in the reference portion resistance that are not caused by a sensed environmental condition may be compensated.

20 Claims, 11 Drawing Sheets

(56) References Cited

U.S. PATENT DOCUMENTS

| | | | |
|---|---|---|---|
| 6,362,632 B1 | 3/2002 | Livingston | |
| 6,975,103 B1 | 12/2005 | Blom | |
| 7,244,500 B2 | 7/2007 | Watts et al. | |
| 7,286,210 B2 | 10/2007 | Pettit | |
| 7,398,184 B1 | 7/2008 | Chen | |
| 7,553,341 B2 | 6/2009 | Pan et al. | |
| 7,781,862 B2 | 8/2010 | Bertin et al. | |
| 7,881,679 B1 | 2/2011 | Faravash et al. | |
| 7,940,063 B2 | 5/2011 | Shimizu et al. | |
| 8,133,465 B2 | 3/2012 | Dai et al. | |
| 8,271,218 B2 | 9/2012 | Colinet et al. | |
| 8,378,757 B2 | 2/2013 | Shin et al. | |
| 8,451,124 B2 | 5/2013 | Lynch et al. | |
| 8,552,597 B2 | 10/2013 | Song et al. | |
| 8,766,775 B2 | 7/2014 | Farrell et al. | |
| 8,787,904 B1 | 7/2014 | Hayes et al. | |
| 8,830,037 B2 | 9/2014 | Burke | |
| 8,890,547 B2 | 11/2014 | Maharyta et al. | |
| 9,018,616 B2 | 4/2015 | Hanein et al. | |
| 9,091,657 B2 | 7/2015 | Kessler et al. | |
| 9,232,475 B2 | 1/2016 | Heinzelman et al. | |
| 9,256,327 B2 | 2/2016 | Salaverry et al. | |
| 9,268,441 B2 | 2/2016 | Walsh et al. | |
| 9,372,209 B2 | 6/2016 | Iwamoto | |
| 9,429,491 B2 | 8/2016 | Bemis et al. | |
| 9,480,163 B2 | 10/2016 | Kessler et al. | |
| 9,582,981 B2 | 2/2017 | Rokhsaz et al. | |
| 9,600,125 B2 | 3/2017 | Badaye et al. | |
| 9,608,698 B2 | 3/2017 | Sessink et al. | |
| 9,721,463 B2 | 8/2017 | Rowland et al. | |
| 9,921,705 B2 | 3/2018 | Shibata | |
| 10,062,831 B2 | 8/2018 | Hasan et al. | |
| 10,114,987 B2 | 10/2018 | Nikunen et al. | |
| 10,146,360 B2 | 12/2018 | Vandermeijden et al. | |
| 10,210,445 B2 | 2/2019 | Nikunen et al. | |
| 10,352,726 B2 | 7/2019 | Gidd et al. | |
| 10,429,483 B2 | 10/2019 | Qu et al. | |
| 10,502,676 B2 | 12/2019 | Kessler et al. | |
| 10,581,176 B2 | 3/2020 | Puchades et al. | |
| 10,831,323 B2 | 11/2020 | Bohannon et al. | |
| 10,939,379 B2 | 3/2021 | Quinlan et al. | |
| 10,944,162 B2 | 3/2021 | Stein | |
| 2002/0154029 A1 | 10/2002 | Watters et al. | |
| 2004/0178806 A1* | 9/2004 | Foreman | G01R 27/205 324/691 |
| 2004/0239504 A1 | 12/2004 | Kalinin et al. | |
| 2005/0140457 A1 | 6/2005 | Bellantoni | |
| 2005/0149807 A1 | 7/2005 | Xu | |
| 2005/0183492 A1 | 8/2005 | Rao et al. | |
| 2005/0269213 A1 | 12/2005 | Steimle et al. | |
| 2005/0284232 A1 | 12/2005 | Rice | |
| 2006/0014155 A1 | 1/2006 | Hamers et al. | |
| 2006/0162431 A1 | 7/2006 | Harris et al. | |
| 2007/0096565 A1 | 5/2007 | Breed | |
| 2007/0120572 A1 | 5/2007 | Chen et al. | |
| 2007/0126553 A1 | 7/2007 | Park et al. | |
| 2007/0159187 A1* | 7/2007 | Chen | G01N 17/04 324/700 |
| 2008/0135614 A1 | 6/2008 | Werner et al. | |
| 2008/0202930 A1 | 8/2008 | Mett | |
| 2008/0204275 A1 | 8/2008 | Wavering et al. | |
| 2009/0039864 A1 | 2/2009 | Gordon | |
| 2009/0121872 A1 | 5/2009 | Lynch et al. | |
| 2009/0126471 A1 | 5/2009 | Fay et al. | |
| 2009/0157358 A1 | 6/2009 | Kim | |
| 2010/0008825 A1 | 1/2010 | Subramanyam | |
| 2010/0027596 A1 | 2/2010 | Bellaouar et al. | |
| 2010/0097273 A1 | 4/2010 | Biris et al. | |
| 2010/0161004 A1 | 6/2010 | Najafi et al. | |
| 2010/0178543 A1 | 7/2010 | Gruner et al. | |
| 2010/0201189 A1 | 8/2010 | Kirby et al. | |
| 2010/0320569 A1 | 12/2010 | Narita | |
| 2011/0001502 A1 | 1/2011 | Walker | |
| 2011/0012723 A1 | 1/2011 | Adamson et al. | |
| 2011/0101996 A1 | 5/2011 | Potyrailo | |
| 2011/0240621 A1 | 10/2011 | Kessler et al. | |
| 2011/0293218 A1 | 12/2011 | Pettit | |
| 2012/0038377 A1 | 2/2012 | Hamann et al. | |
| 2012/0055810 A1 | 3/2012 | Zhou | |
| 2012/0240667 A1 | 9/2012 | Geneste et al. | |
| 2012/0256492 A1 | 10/2012 | Song et al. | |
| 2012/0286804 A1 | 11/2012 | Kato et al. | |
| 2013/0104665 A1 | 5/2013 | Biris et al. | |
| 2013/0210154 A1 | 8/2013 | Dieckhoff et al. | |
| 2013/0230429 A1 | 9/2013 | Naishadham et al. | |
| 2014/0126442 A1 | 5/2014 | Jafarian et al. | |
| 2014/0145826 A1 | 5/2014 | Conner | |
| 2014/0184249 A1 | 7/2014 | Saafi et al. | |
| 2014/0191768 A1 | 7/2014 | Engl | |
| 2014/0200538 A1 | 7/2014 | Euliano et al. | |
| 2014/0254445 A1 | 9/2014 | Heinzelman et al. | |
| 2014/0266025 A1 | 9/2014 | Jakubowski | |
| 2015/0239708 A1* | 8/2015 | Palazzola | B66B 7/123 187/390 |
| 2015/0317896 A1 | 11/2015 | Planton et al. | |
| 2015/0330212 A1 | 11/2015 | Sassi et al. | |
| 2016/0007288 A1 | 1/2016 | Samardzija et al. | |
| 2016/0033403 A1 | 2/2016 | Packirisamy et al. | |
| 2016/0050757 A1 | 2/2016 | Diao et al. | |
| 2016/0196455 A1 | 7/2016 | Gudan et al. | |
| 2016/0238547 A1 | 8/2016 | Park et al. | |
| 2016/0254844 A1 | 9/2016 | Hull et al. | |
| 2016/0274001 A1 | 9/2016 | Parker et al. | |
| 2016/0302264 A1 | 10/2016 | Kessler et al. | |
| 2016/0337789 A1 | 11/2016 | Rokhsaz | |
| 2017/0019954 A1 | 1/2017 | Kessler et al. | |
| 2017/0168021 A1 | 6/2017 | Van Tooren et al. | |
| 2017/0230916 A1 | 8/2017 | Stein et al. | |
| 2017/0237466 A1 | 8/2017 | Carr | |
| 2017/0331844 A1 | 11/2017 | Harrigan et al. | |
| 2017/0358854 A1 | 12/2017 | Stein | |
| 2018/0003615 A1 | 1/2018 | Kessler et al. | |
| 2018/0095001 A1 | 4/2018 | Sun et al. | |
| 2018/0139698 A1 | 5/2018 | Quinlan et al. | |
| 2018/0191451 A1 | 7/2018 | Lynch et al. | |
| 2018/0246200 A1 | 8/2018 | Goossen et al. | |
| 2019/0002120 A1 | 1/2019 | Vinson et al. | |
| 2019/0112072 A1 | 4/2019 | Abe et al. | |
| 2019/0113941 A1 | 4/2019 | Dubois et al. | |
| 2019/0193371 A1 | 6/2019 | Shinozaki et al. | |
| 2019/0243696 A1 | 8/2019 | Snyder | |
| 2019/0252919 A1 | 8/2019 | Ogawa et al. | |
| 2019/0294275 A1 | 9/2019 | Ko et al. | |
| 2020/0014354 A1 | 1/2020 | Luk et al. | |
| 2020/0016626 A1 | 1/2020 | Holmes | |
| 2020/0189229 A1 | 6/2020 | Palmer et al. | |
| 2020/0235713 A1 | 7/2020 | Luk et al. | |
| 2020/0241670 A1 | 7/2020 | Abu Saude et al. | |
| 2020/0247562 A1 | 8/2020 | Stein | |
| 2020/0309674 A1 | 10/2020 | Wardle et al. | |
| 2020/0321787 A1 | 10/2020 | Miller | |
| 2021/0013747 A1 | 1/2021 | Wang et al. | |
| 2021/0083510 A1 | 3/2021 | Liu et al. | |
| 2021/0153128 A1 | 5/2021 | Quinlan et al. | |
| 2021/0314871 A1 | 10/2021 | Stein et al. | |
| 2022/0128609 A1 | 4/2022 | Stein et al. | |

FOREIGN PATENT DOCUMENTS

| | | |
|---|---|---|
| CN | 102612638 A | 7/2012 |
| CN | 102782625 B | 10/2016 |
| CN | 103294299 B | 12/2016 |
| CN | 107576690 A | 1/2018 |
| CN | 105934733 B | 2/2019 |
| EP | 1 968 429 B1 | 4/2013 |
| EP | 2 789 992 A1 | 10/2014 |
| EP | 2 985 925 A1 | 2/2016 |
| EP | 3 190 421 A1 | 7/2017 |
| JP | 6310011 B2 | 4/2018 |
| KR | 10-0839226 B1 | 6/2008 |
| WO | WO 2001/013087 A2 | 2/2001 |
| WO | WO 2006/137849 A1 | 12/2006 |

(56) References Cited

FOREIGN PATENT DOCUMENTS

| WO | WO 2008/125878 A1 | 10/2008 |
|---|---|---|
| WO | WO 2017/214488 A1 | 12/2017 |
| WO | WO 2010/150009 A1 | 12/2019 |

OTHER PUBLICATIONS

International Preliminary Report on Patentability dated Dec. 20, 2018 in connection with International Application No. PCT/US2017/036719.
International Search Report and Written Opinion dated Oct. 24, 2017 in connection with International Application No. PCT/US2017/040356.
International Preliminary Report on Patentability dated Jan. 10, 2019 in connection with International Application No. PCT/US2017/040356.
International Search Report and Written Opinion dated Jun. 21, 2021 in connection with International Application No. PCT/US2021/025379.
Invitation to Pay Additional Fees dated Nov. 19, 2021 in connection with International Application No. PCT/US21/36993.
International Search Report and Written Opinion dated Feb. 4, 2022 in connection with International Application No. PCT/US21/36993.
Invitation to Pay Additional Fees dated Dec. 28, 2021 in connection with International Application No. PCT/US21/56630.
International Search Report and Written Opinion dated Mar. 4, 2022 in connection with International Application No. PCT/US21/56630.
Kang et al., Structural Health Monitoring based on Electrical Impedance of a Carbon Nanotube Neuron. Key Engineering Materials. 2006;321-323:140-5.
Kang, Carbon Nanotube Smart Materials. Thesis submitted to the Division of Research and Advanced Studies of the University of Cincinnati. 2005; 170 pages.
Kessler, Structural Health Monitoring Capabilities. Metis Design Corporation. Powerpoint Presentation 2008, 42 pages.
Lazaro et al., A Passive Harmonic Tagfor Humidity Sensing. International Journal of Antennas and Propogation. Jul. 23, 2014; 2014 (670345): 11 pages.
Loh et al., Passive wireless sensing using SWNT-based multifunctional thin film patches. International Journal of Applied Electromagnetics and Mechanics. 2008; 28:87-94.
Lurz et al., Reader Architectures for Wireless Surface Acoustic Wave Sensors. Sensors. May 28, 2018; 18(1734):29 pages.
Lynch et al., A Summary Review of Wireless Sensors and Sensor Networks for Structural Health Monitoring. The Shock and Vibration Digest. Mar. 2006;38(2):91-128.
Mahbub et al., Electronic Sensor Interfaces With Wireless Telemetry. Intech. Advances in Bioengineering. 2015; Chapter 6:151-175.
Oh et al., A 116n W Multi-Band Wake-Up Receiver with 31-bit Correlator and Interference Rejection. Custom Integrated Circuits Conference (CICC), 2013 IEEE. 4 pages.
Rinaldi et al., Corrosion Sensor Development for Condition-Based Maintenance of Aircraft. International Journal of Aerospace Engineering. 2012; 2012:11 pages. Article IDS 684024.
Roberts et al., A 236nW-56.5dBm-Sensitivity Bluetooth Low-Energy Wakeup Receiver with Energy Harvesting in 65nm CMOS. 2016 IEEE International Solid-State Circuits Conference. Digest of Technical Papers. 2016; pp. 450-451.
Rocheleau et al., MEMS-Based Tunable Channel-Selecting Super-Regenerative RF Transceivers. Berkeley Sensor & Actuator Center. University of California. Prepublication Data Sep. 2015; 2 pages.
Sample et al., Design of an RFID-Based Battery-Free Programmable Sensing Platform. IEEE Transactions on Instrumentation and Measurement. Nov. 2008;57(11):2608-15.
U.S. Appl. No. 17/511,065, filed Oct. 26, 2021, Stein.
U.S. Appl. No. 16/840,274, filed Apr. 3, 2020, Stein.
U.S. Appl. No. 17/158,733, filed Jan. 26, 2021, Quinlan.
Chiodarelli et al., Measuring the Electrical Resistivity and Contact Resistance of Vertical Carbon Nanotube Bundles for Application as Interconnects. Nanotechnology. Jan. 17, 2011; 22:085302 (7 Pages).
Lee et al., Formation of Low-Resistance Ohmic Contacts between Carbon Nanotube and Metal Electrodes by a Rapid Thermal Annealing Method. J. Phys. D: Appl. Phys. Jun. 1, 2000; 33:1953-1956.
Van Den Heever et al., Tactile Sensing using Force Sensing Resistors and a Super-Resolution Algorithm, IEEE Sensors Journal. Jan. 1, 2009; 9(1): 29-35.
Zhao et al., Decrease of Contact Resistance at the Interface of Carbon Nanotube/Electrode by Nanowelding. Electron. Mater. Lett. Oct. 12, 2016; 6 pages.
International Preliminary Report on Patentability dated Oct. 13, 2022 in connection with International Application No. PCT/US2021/025379.
International Preliminary Report on Patentability dated Dec. 22, 2022 in connection with International Application No. PCT/US2021/036993.

* cited by examiner

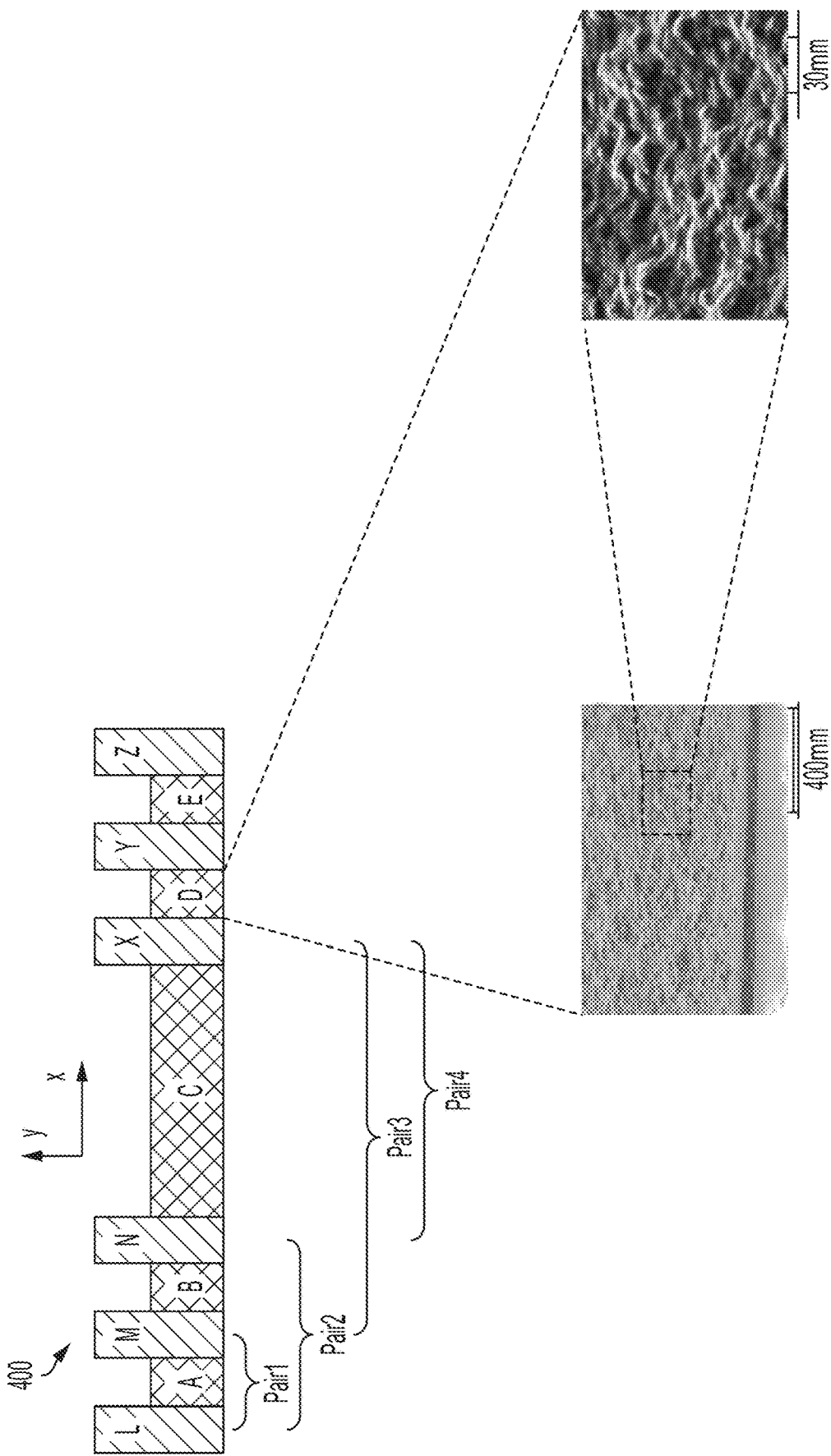

| Pair# | Measured Resistance |
|---|---|
| Pair1 | $R1 = R_L + R_A + R_M$ |
| Pair2 | $R2 = R_L + R_A + R_B + R_N$ |
| Pair3 | $R3 = R_M + R_B + R_C + R_X$ |
| Pair4 | $R4 = R_N + R_C + R_X$ |

FIG. 4B

| Pair # | Measured Resistance |
|---|---|
| Pair1 | $R1 = R_L + R_A + R_M$ |
| Pair2 | $R2 = R_L + R_A + R_B + R_N$ |
| Pair3 | $R3 = R_M + R_B + R_N$ |
| Pair4 | $R4 = R_M + R_B + R_C + R_X$ |
| Pair5 | $R5 = R_N + R_C + R_X$ |
| Pair6 | $R6 = R_N + R_C + R_D + R_Y$ |
| Pair7 | $R7 = R_X + R_D + R_Y$ |
| Pair8 | $R8 = R_X + R_D + R_E + R_Z$ |
| Pair9 | $R9 = R_Y + R_E + R_Z$ |

FIG. 5B

SELF-CALIBRATING POLYMER NANO COMPOSITE (PNC) SENSING ELEMENT

CROSS-REFERENCE TO RELATED APPLICATIONS

This application claims the benefit of U.S. Provisional Application Ser. No. 63/038,551, filed on Jun. 12, 2020, and entitled "SELF-CALIBRATING POLYMER NANO COMPOSITE (PNC) SENSING ELEMENT," which is hereby incorporated herein by reference in its entirety.

FEDERALLY SPONSORED RESEARCH OR DEVELOPMENT

This invention was made with government support under Contract No. FA8649-20-9-9068 awarded by the U.S. Air Force. The government has certain rights in the invention.

FIELD OF THE DISCLOSURE

The present application generally relates to sensors and in particular, relates to measurement of a resistive sensor.

BACKGROUND

Sensors are devices that are sometimes used for sensing various environmental conditions or structural health conditions. Environmental or structural sensors sense a condition of interest and communicate in a wired or wireless fashion with a reader apparatus. Multiple sensors may be deployed to monitor multiple spatial locations of a structure or an environment, and these sensors may also be referred to as sensor nodes.

One or more states of a target material within a sensor may change when the target material is exposed to certain environmental conditions. For example, a target material may be subject to corrosion when exposed to certain temperature, mechanical vibration, humidity or moisture conditions over a period of time, such that physical and chemical characteristics of the target material may change over the same period of time. As another example, a target material in a crack sensor may be subject to mechanical stress reflective of a structural component within a vehicle such as an aircraft, such that one or more physical characteristics of the target material may change in response to a change in structural health condition of the monitored component. A sensor apparatus may be used to monitor a state of the target material.

Sometimes a sensor communicates with a reader using a wireless transceiver and antennas included in the sensor. The sensor uses an external or battery-powered energy source to operate the transceiver and/or other components of the sensor.

SUMMARY OF THE DISCLOSURE

Aspects of the present application allow for measurement of a calibrated resistance for a resistive film in a sensing element, such that effects from contact resistance and background resistance drifts due to factors such as temperature, strain or aging can be reduced or eliminated. In some embodiments, by taking a plurality of two-terminal resistance measurements between various pairs of electrodes on a resistive film, a contact-resistance-independent resistance of a reference portion of the resistive film can be determined. Further, a contact-resistance-independent resistance of a sensing portion of the resistive film can be determined based on a plurality of two-terminal resistance measurements between pairs of electrodes. The resistance of the reference portion can be removed from the measured resistance of the sensing portion, such that variations in the reference portion resistance that are not caused by a sensed environmental condition may be compensated.

According to some embodiments, a self-compensating sensor is provided. The self-compensating sensor comprises a sensing element. The sensing element comprises a polymer nano composite (PNC) film. The self-compensating sensor further comprises a plurality of electrical breakout points disposed on the sensing element; a measurement circuit coupled to the plurality of electrical breakout points. The measurement circuit is configured to measure a plurality of resistance values between a plurality of pairs of electrical breakout points selected from the plurality of electrical breakout points; based on the plurality of resistance values, calculate a first resistance of a sensing portion of the PNC film exposed to an environment; based on the plurality of resistance values, calculate a second resistance of a reference portion of the PNC film adjacent the sensing portion; and determine a compensated resistance by comparing the first resistance of the sensing portion and the second resistance of the reference portion. The compensated resistance is indicative of a sensed condition of the environment.

According to some embodiments, a method for sensing a structural health condition of a structure using a sensing element is provided. The sensing element comprises a resistive film and a plurality of linearly arranged electrodes in electrical contact with the resistive film. The method comprises measuring a plurality of resistance values between a plurality of pairs of electrodes selected from the plurality of linearly arranged electrodes; based on the plurality of resistance values, calculating a contact-resistance-independent resistance value of a sensing portion of the resistive film; based on the plurality of measured resistance values, calculating a contact-resistance-independent resistance value of a reference portion of the resistive film; and determining a compensated resistance value by combining the resistance value of the sensing portion and the resistance value of the reference portion, such that the compensated resistance is indicative of the structural health condition.

According to some embodiments, a sensor is provided. The sensor comprises a resistive film having a sensing portion and a reference portion adjacent to the sensing portion; a plurality of linearly arranged electrodes including a first pair of electrodes contacting the sensing portion and a second pair of electrodes contacting the reference portion; a measurement circuit coupled to the plurality of linearly arranged electrodes. The measurement circuit is configured to measure a plurality of resistance values between a plurality of pairs of electrodes selected from the plurality of electrodes; based on the plurality of resistance values, calculate a contact-resistance-independent resistance value of the sensing portion; based on the plurality of measured resistance values, calculate a contact-resistance-independent resistance value of the reference portion; and determine a compensated resistance value by combining the resistance value of the sensing portion and the resistance value of the reference portion.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear. In the drawings:

FIG. 4A is a schematic top view diagram of an exemplary PNC sensing element and several measurement configurations, in accordance with some embodiments;

FIG. 4B is a table illustrating an exemplary method using four two-terminal resistance measurements to obtain a contact-resistance-independent resistance of a region of the resistive film, in accordance with some embodiments;

FIG. 5B is a table illustrating an exemplary method using four two-terminal resistance measurements to obtain a contact-resistance-independent resistance for several regions of the resistive film, in accordance with some embodiments;

DETAILED DESCRIPTION

Figure 1:
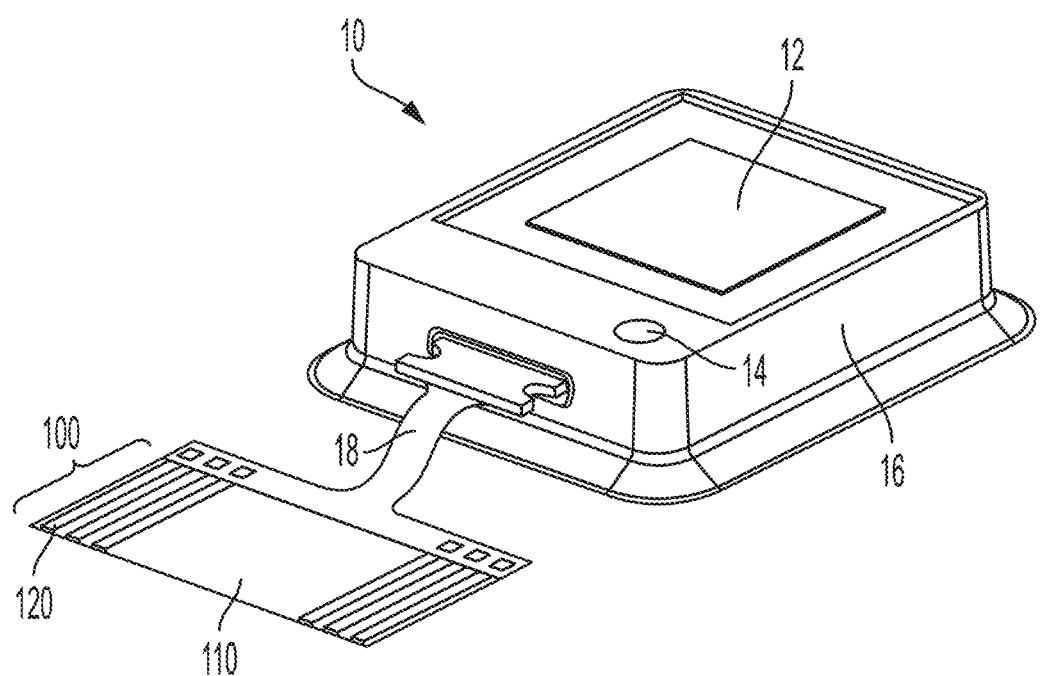
FIG. 1 is a schematic diagram of an exemplary sensor, in accordance with some embodiments.

Aspects of the invention are directed to a self-compensating sensor based on resistive sensing elements having a polymer nano composite (PNC) film and a plurality of electrodes in contact with various points on the PNC film. One goal of the present application is directed to countering two factors that may influence accurate measurement of resistance in a resistive environmental sensor. The inventors have recognized and appreciated that when using a resistive film to sense a condition of the environment, such as the state of corrosion or a structural crack length, the measured resistance value may be influenced by material properties of the resistor itself, irrespective of environmental conditions. In addition, the measured resistance values may be influenced to a significant degree by the contact resistance between the PNC film and respective electrodes.

Embodiments of the present application provide a solution that addresses both such influences of the measured resistance value. In some embodiments, by taking a plurality of two-terminal resistance measurements between various pairs of electrodes on the resistive strip, a contact-resistance-independent resistance of a reference portion of the PNC film can be determined. Further, a contact-resistance-independent resistance of a sensing portion of the PNC film can be determined based on a plurality of two-terminal resistance measurements between pairs of electrodes. The resistance of the reference portion can be removed from the measured resistance of the sensing portion, such that variations in the reference portion resistance that are not caused by a sensed environmental condition may be compensated.

Some aspects of the present application allow for measurement of a calibrated resistance for a resistive film in a sensing element, such that effects from contact resistance and background resistance drifts due to factors such as temperature, strain or aging can be reduced or eliminated.

According to some aspects of the present application, a sensing element in a sensor has a resistive film, where resistance value of at least a portion of the resistive film can be indicative of a sensed condition. For example, a portion of the resistive film may be exposed to mechanical stress or a corrosive environment, and its resistance value can represent a state of structural health, a state of corrosion, or a state of erosion. The inventors have recognized and appreciated that resistance of a resistive film in a sensor apparatus may be subject to background drift over a period of time and overall signals measured may comprise a sensor signal superimposed on the background drift. The background drift may be caused by, for example, internal temperature and humidity changes that are unrelated to the environment of the target material is disposed in. Moreover, in a resistive sensor, the resistive film to contact junction resistance adds a bias error to two-terminal resistance measurements, which makes it hard to accurately measure resistance of the resistive film itself, and accurately measure changes to the resistive film resistance due to change in sensed conditions.

A calibration of a resistive film sensor may correct sensor background drift. One approach is to provide two separate resistive arms within the same sensor apparatus, with one resistive arm serving as a reference resistor. The two resistive arms are subject to the same background drift to effectively subtract the common background drift while accentuating desired sensor signal from one of the two resistive arms that has exposure to the sensed environment, thus increasing the signal to background ratio without the need to take the sensor apparatus offline to perform a calibration. An example of this approach is described in U.S. Pat. No. 10,502,676, the disclosure of which is hereby incorporated by reference in its entirety.

The inventors of the present application have recognized and appreciated that a sensing element may be provided that has a single piece of resistive film with electrical contact made via multiple electrodes at a plurality of contact points on the resistive film. The resistive film has a plurality of regions defined between adjacent contact points, and the sensing element may be operated to accurately obtain resistance value of one or more regions of the resistive film by removing the contribution of contact resistance. One of the regions may have resistance changes that are representative of the sensed condition, while another one of the regions may be a reference resistor to calibrate or compensate for effects of background drift, without having to rely upon a reference resistor as a separate component. Thus a sensing element as described herein may be referred to as a self-calibrating, or self-compensating sensing element.

According to an aspect of the present application, accurate resistance measurement is achieved using a method to take multiple measurements through various combination of contact points pairs. In some embodiments, the method includes measuring a resistance value between pairs of electrodes selected from at least four electrodes of the plurality of electrodes, and based on the measured resistance values, calculating a calibrated resistance of the resistive film that is representative of a sensed condition.

The aspects and embodiments described above, as well as additional aspects and embodiments, are described further below. These aspects and/or embodiments may be used individually, all together, or in any combination of two or more, as the application is not limited in this respect.

FIG. 1 is a schematic diagram of an exemplary sensor, in accordance with some embodiments. FIG. 1 shows a sensor 10 that has a measurement module 16, a sensing element 100, a connector 18, and a sensing element 100. Measurement module 16 is coupled to sensing element 100 via connector 18, which may be a cable such as a flexible ribbon cable, while other suitable connectors that can provide electrical communication can also be used. Sensor 10 may also have one or more antennas 12 for transmitting and receiving power and data signals from an external device such as a reader. The measurement module 16 may include a housing, and an indicator 14 may be provided on an exterior of the housing to provide visual feedback to an operator. Indicator 14 may include for example one or more light emitting diodes (LEDs).

Sensing element 100 includes a resistive film 110 and a plurality of electrodes 120 in contact with the resistive film 120. The plurality of electrodes 120 form a plurality of electrical breakout points disposed on sensing element 100 that interface with connector 18. Electrodes 120 may be formed by, for example deposition of strips of metal such as Au or Cu on the surface of resistive film 110. In some embodiments, the resistive film may comprise polymer nano composite (PNC), and may be referred to as a PNC film. In a non-limiting example, a PNC film may comprise carbon nanotubes (CNT). In an exemplary PNC film, the CNT may be evenly dispersed through a volume of polymer, disposed in a sheet or film, while other forms of mixing CNT in the PNC film may also be used.

As shown in FIG. 1, electrodes 120 are arranged in a linear array on the resistive film 110, and has 6 electrodes. However, it should be appreciated that the FIG. 1 shows an illustrative example only, and in some embodiments, there may be less than 6 electrodes, such as 5 electrodes. In some embodiments, more than 6 electrodes may be used.

While not shown in FIG. 1, a non-conductive layer may be disposed on a bottom surface of the sensor, such as on a surface of the measurement module 16, and/or on the bottom surface of sensing element 100 to provide improved electrical isolation from and improved adhesion to a host material or structure that is being monitored by the sensor. A non-conductive layer may additionally or optionally disposed on a top surface of the sensor to provide improved electrical and contamination isolation from the surrounding environment.

Sensor 10 may be powered and interrogated wirelessly and used to sense a structural health condition of a structure as part of a Wireless Integrity Sensing platform (WISP). An example of a WISP is described in U.S. patent application Ser. No. 16/268,437, filed on Feb. 5, 2019 and entitled "INTEGRATED RF POWERED PLATFORM FOR STRUCTURE HEALTH MONITORING (SHM) OF AIRCRAFT USING NANOSTRUCTURED SENSING MATERIAL," and published as U.S. Pat. Pub. No. 2020/0247562 A1, the disclosure of which is hereby incorporated by reference in its entirety.

Figure 2A:
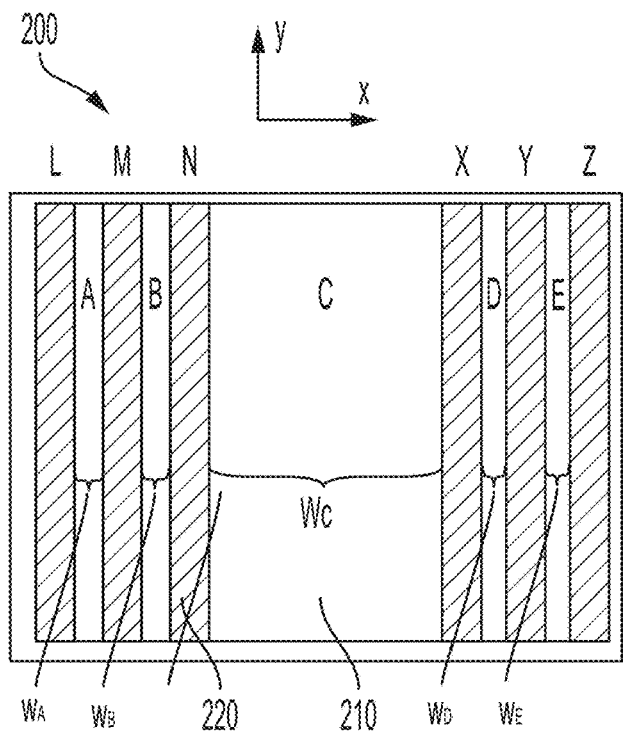
FIG. 2A is a schematic top-view diagram of an exemplary sensing element, in accordance with some embodiments.

FIG. 2A is a schematic top-view diagram of an exemplary sensing element 200, in accordance with some embodiments. As shown in FIG. 2A, electric contacts to a resistive film 210 is made by six electrodes 220, each bearing labels L, M, N, X, Y and Z, respectively. In FIG. 2A, electrodes 220 are shaped as thin strips that define regions of resistive film 210 between adjacent electrodes bearing labels A, B, C, D and E.

Figure 2B:
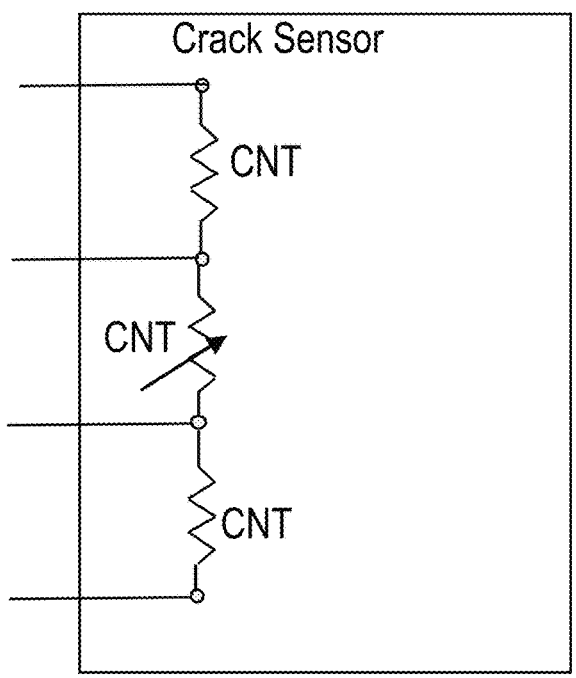
FIG. 2B is a schematic circuit diagram showing an equivalent circuit representing the sensing element shown in FIG. 2A.

FIG. 2B is a schematic circuit diagram showing an equivalent circuit representing the sensing element shown in FIG. 2A. Electrical resistance of a region may be measured and correlated to a physical property of a host material or structure, or to the environment of the host material or structure. For example, sensing element 200 may be a structural health monitor and region C of the sensing element 200 as shown in FIG. 2A may be a sensing portion attached to a structure and subject to the same physical constraints of the structure, such that a change in resistance in region C can be used to calculate a change of the structural property such as strain or occurrence of cracking. In some embodiments, resistance measurements of a region of sensing element 200 may be correlated to the degree of damage, the extent of a flaw or remaining useful life (RUL) of the host material or structure. In one non-limiting example, the resistance measurement of a region may be correlated to the length of a crack that has grown in a material.

Figure 3A:
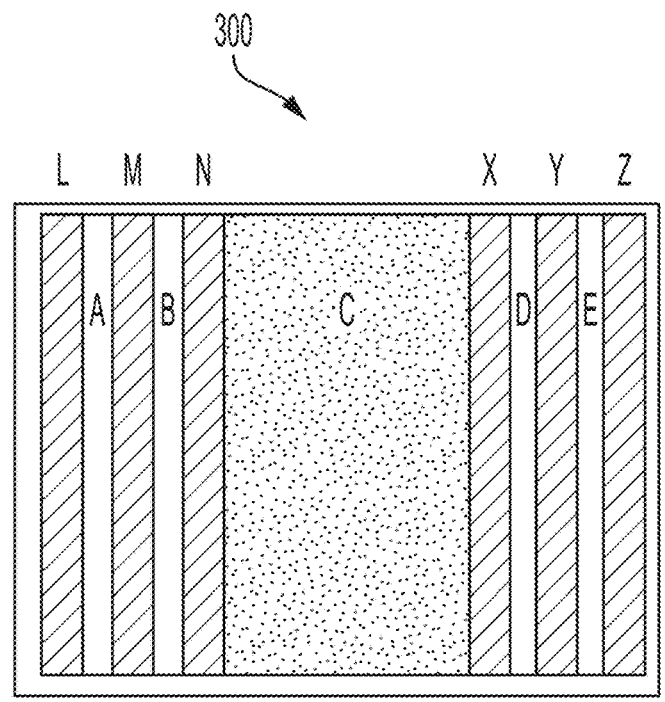
FIG. 3A is a schematic top-view diagram of an exemplary sensing element, in accordance with some embodiments.

FIG. 3A is a schematic top-view diagram of an exemplary sensing element 300, in accordance with some embodiments. Sensing element 300 is similar to sensing element 200 in FIG. 2A in many aspects, with like components marked with the same reference numbers.

Figure 3B:
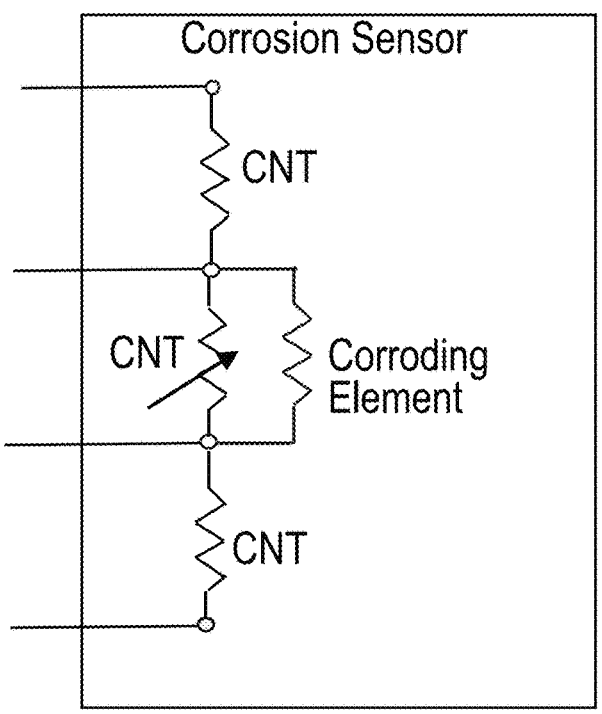
FIG. 3B is a schematic circuit diagram showing an equivalent circuit representing the sensing element shown in FIG. 3A.

FIG. 3B is a schematic circuit diagram showing an equivalent circuit representing the sensing element shown in FIG. 3A. Sensing element 300 may be a witness corrosion sensing element, where region C is coated with a corrosion sensitized material such as an electroplated Cu. In this embodiment, a measurement of resistance of region C (referred to below as $R_C$, and similarly for resistance of other regions labeled alphabetically) may be correlated to the degree of exposure of region C to a corrosive environment.

Referring back to FIG. 2A, in the embodiment that region C is a sensing portion that has a resistance representative of a sensed condition of a host material, another region that is not subject to the sensed condition may be a reference portion or reference region, whose resistance may be used to compensate for background drifts in the resistive film. For example, since regions B and C are part of the same resistive film, their resistance values are subject to the same material and/or manufacturing variability and proportional changes due to mechanical and/or environmental factors such as strain or temperature changes or aging across the entire resistive film. In some embodiments where properties of the resistive film 210 is not uniform across the X-Y plane, region B may be more preferably selected as a reference portion compared to for example region A, since region B is disposed closer in proximity to the sensing portion at region C, and therefore more accurately reflects the resistance of the underlying film material at region C.

The resistance values of a region may be defined and measured in any suitable ways. For example, a resistance value of region C may be a resistance in Ohms measured along the x-direction across the left extent and the right extent in between electrodes N and X. If the thickness and resistivity of resistive film 210 is substantially uniform across region C, then its resistance value may also be characterized using square resistance in Ohm/sq. Additionally, a calculated resistivity of region C may be used.

The inventors hare recognized and appreciated that when trying to measure resistance value of region C, a traditional approach of measuring the two-terminal resistance between electrode N and X in FIG. 2 will yield an overstated $R_{NX}=R_N+R_C+R_X$, where $R_C$ is the actual resistance of the resistive film at region C, $R_N$ and $R_X$ are contact resistances at the two contact points in between electrode N to the resistive film and between electrode X to the resistive film, respectively. $R_N$ and $R_C$ are unknown values that are not necessarily equal to each other. An aspect of the present application is directed to a method using multiple two-terminal resistance measurements at several select pairs of electrodes to extract a calibrated or compensated resistance value that is contact-resistance-independent, that is, without any contribution from contact resistance.

In FIG. 2A, the dimensions of the components such as the width in X- and Y-directions for electrodes 220 and regions A-E of the resistive film 210 can be selected in any suitable manner. FIG. 2A illustrates that each of the regions A-E has a respective width $W_A$, $W_B$, $W_C$, $W_D$, and $W_E$ along the X-direction, or along a direction of the current flow within the resistive film 210 during a sensing operation using the sensing element 200. In some embodiments, a sensor is provided, and the width of the compensation region is greater than the width of the side region. For example, in some embodiments, region C is used as a sensing portion, region B is used as a reference portion or compensation region, and its width $W_B$ is larger than the side region $W_A$ adjacent the outer boundaries of the resistive film 210. In a non-limiting example, $W_C$ is 12.5 mm, $W_B$ is 2.5 mm, $W_A$ is 1.5 mm, and each of $W_D$ and $W_E$ is 1.5 mm, although other dimensions may also be used. It should be appreciated that the same sizing considerations could be applied to the other figures showing the electrode layout (FIGS. 2C, 3A, 4A, 5A).

Figure 2C:
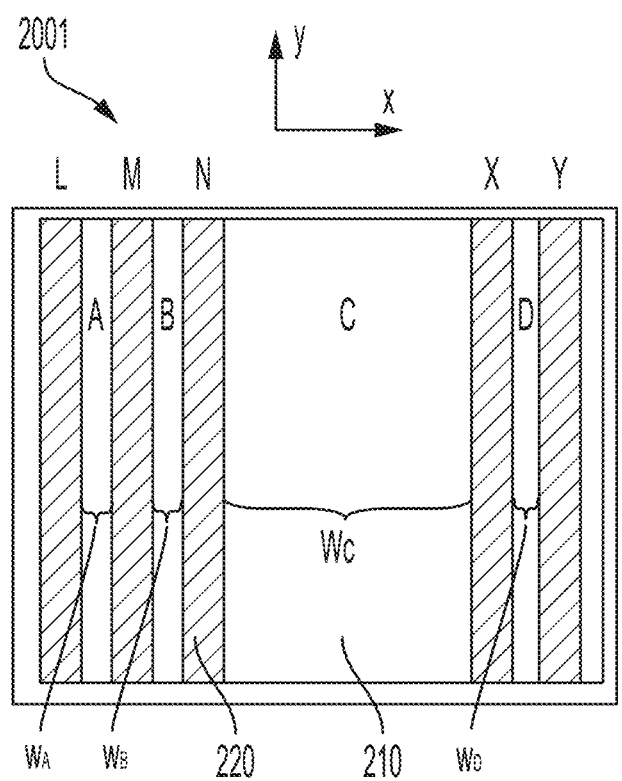
FIG. 2C is a schematic top-view diagram of an exemplary sensing element with five electrodes, in accordance with some embodiments.

FIG. 2C is a schematic top-view diagram of an exemplary sensing element 2001 with five electrodes, in accordance with some embodiments. Sensing element 2001 is similar to sensing element 200 in FIG. 2A in many aspects, with electrode Z removed such that only five electrodes are used on resistive film 210. In some embodiments, region C of sensing element 2001 may be used as a sensing portion, while region B used as a reference portion, as discussed above in relation with FIG. 2A. It should be appreciated that while other figures in this disclosure illustrate six electrodes on a resistive film, aspects of the present application do not require six electrodes and the examples illustrated throughout the application could be implemented in alternative embodiments with only five electrodes.

FIG. 4A is a schematic top view diagram of an exemplary PNC sensing element 400 and several measurement configurations, in accordance with some embodiments. The inset to FIG. 4A shows two scanning electron microscopy (SEM) images of the surface of the PNC film at region D, which shows an un-uniform surface topography with peaks and valleys. In particular, the left panel of the SEM images shows CNT clustered on some area causing a non-uniform surface. The right panel of the SEM images shows peaks and valleys across the surface being imaged. The non-uniform surface topography is likely to generate a non-negligible amount of contact resistance between electrodes L, M, N, X, Y, Z with the PNC film, which can be compensated using the method described herein.

A two-terminal resistance could be measured between any combination of two electrodes using any suitable measurement device, such as the measurement module 16 in FIG. 1. The measurement can be made based on Ohm's law, for example by measuring the ratio of a static voltage applied across two electrodes versus a current flown through either one of the electrodes. FIG. 4A illustrates four possible permutations of electrode pairs for two-terminal resistance measurements Pair1, Pair2, Pair3 and Pair4.

FIG. 4B is a table illustrating an exemplary method using four two-terminal resistance measurements to obtain a contact-resistance-independent resistance of a region of the resistive film, in accordance with some embodiments. FIG. 4B shows that a resistance measured at pair 1 in FIG. 4A will be $R1=R_L+R_A+R_M$. The method proceeds to measure three more pairs of resistances to obtain $R2=R_L+R_A+R_B+R_N$; $R3=R_M+R_B+R_C+R_X$; $R4=R_N+R_C+R_X$. Using the four formula and by eliminating variables, one can find $R_B=(R2+R3-R1-R4)/2$. Therefore the reference resistor region B's contact-resistance-independent resistance can be obtained without the need to know the exact contact resistance of any electrode to resistive film contacts.

In the embodiment shown in FIG. 4A, region C of PNC sensing element 400 is exposed to the host material or structure. Therefore the contact-resistance-independent resistance $R_C$ is the test resistance R of the target that will change value based on the sensed condition. The contact-resistance-independent resistance for region C may be obtained after taking four two-terminal resistance measurements and combine the results to eliminate contact resistances, and compared to a baseline resistance for region.

According to an aspect of the present application, a baseline resistance Ro for region C may be created by averaging and normalizing $R_B$ using $Ro=R_B \times AF$, where AF is an area factor or geometric factor representing the geometric ratio between region C and region B.

Further according to an aspect, the contact-resistance-independent resistance for region C may be obtained after taking four two-terminal resistance measurements and combine the results to eliminate contact resistances.

Figure 5A:
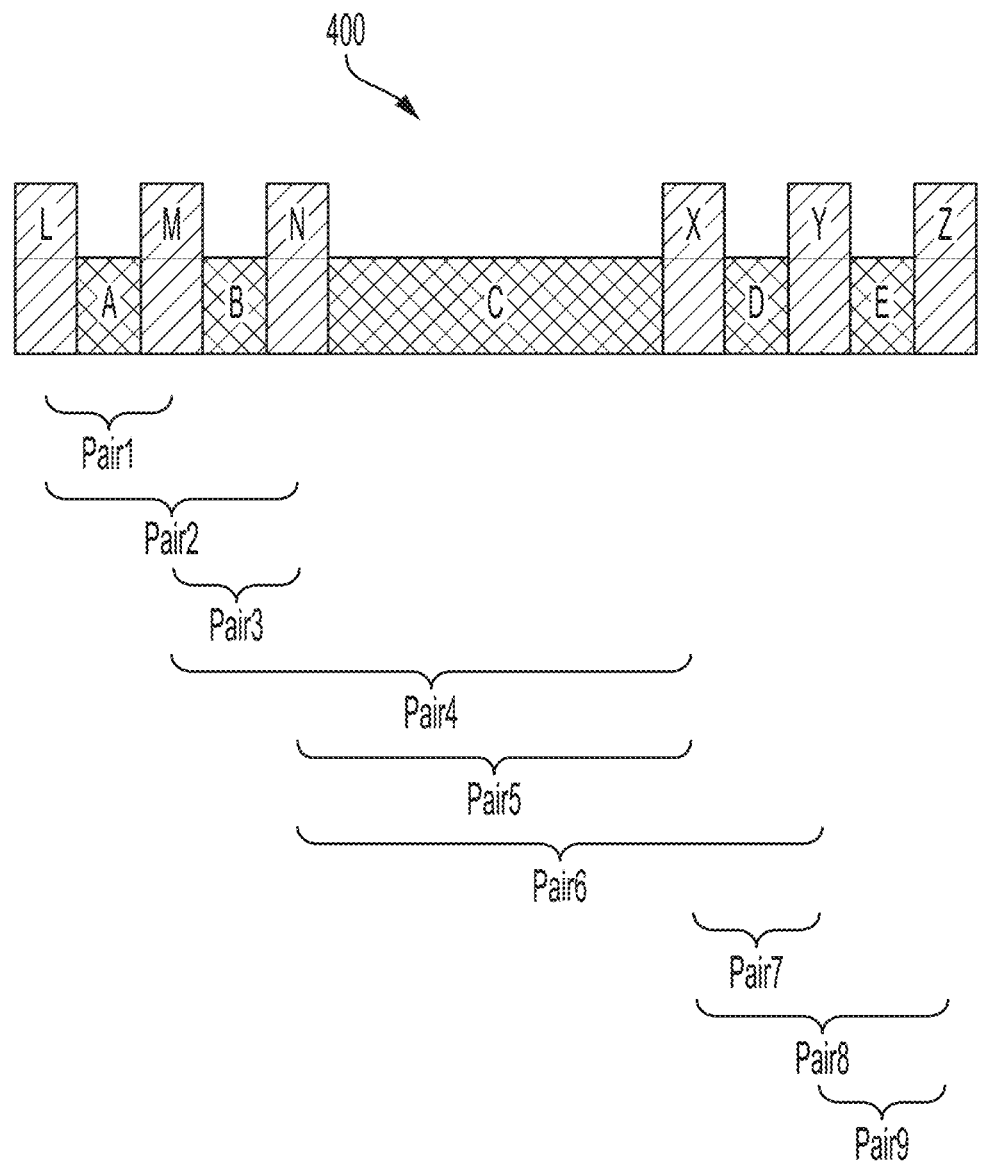
FIG. 5A is a schematic top view diagram of the exemplary PNC sensing element of FIG. 4A, with measurement configurations illustrating nine possible permutations of electrode pairs.

FIG. 5A is a schematic top view diagram of the exemplary PNC sensing element of FIG. 4A, with measurement configurations illustrating nine possible permutations of electrode pairs for two-terminal resistance measurements 1-9, and FIG. 5B is a table illustrating an exemplary method using four two-terminal resistance measurements to obtain a contact-resistance-independent resistance for several regions of the resistive film, in accordance with some embodiments.

FIG. 5B shows that the contact-resistance-independent resistance for region B can be obtained by $R_B=(R2+R4-R1-R5)/2$, the contact-resistance-independent resistance for region C can be obtained by $R_C=(R6+R8-R5-R9)/2$, and the contact-resistance-independent resistance for region D can be obtained by $R_D=(R4+R6-R3-R7)/2$.

In the particular example shown in FIG. 5A, region C of PNC sensing element 400 is exposed to the host material or structure. Therefore the contact-resistance-independent resistance $R_C$ is the test resistance R of the target that will change value based on the sensed condition. However, $R_C$ will also change due to the background drift intrinsic to the PNC film in sensing element 400. To calibrate $R_C$ to remove the background drift effect, $R_B$ and $R_D$, which are from regions B and D that do not vary according to the sensed condition, may be used as reference resistance values to compensate $R_C$.

According to an aspect of the present application, a baseline resistance Ro may be created by averaging and normalizing $R_B$ and $R_D$ using $Ro=(R_B+R_D) \times AF/2$, where AF is an area factor or geometric factor representing the geometric ratio between region C and region B or D. For example, if B has twice the length as C in the x-direction, it is expected that the baseline resistance for C will be twice that of B, and the area factor will be 2.0 to convert $R_B$ into $R_C$. If factors such as width, thickness, and/or resistivity are not identical for regions B and C, but ascertainable prior to the measurement, such factors may be determined during manufacturing of the sensing element and incorporated into AF as a scaling factor. Averaging two reference resistances $R_B$ and $R_D$ will reduce the effect of manufacturing variability of the PNC film across the x-direction, while no averaging or averaging of more than two reference resistances may also be used.

It should be appreciated that regions B and D need not be identical in size, and unique area factors $AF_B$ and $AF_D$ may be used for each to obtain the averaged and normalized baseline $Ro=(R_B \times AF_B + R_D \times AF_D)/2$.

In one non-limiting example, having obtained the baseline resistance Ro and the test resistance R for region C, a calibrated resistance may be obtained as $R/Ro=2R_C/AF \times (R_B+R_D)$ in one example. In this example, the calibrated or compensated resistance is a scaled value, and will be 100% if R is identical to the baseline Ro. Any change in R due to sensed condition will cause R/Ro to vary to represent the change in sensed condition. On the other hand, any background drift in resistance will be identically canceled out in R and in Ro, and will not affect R/Ro.

FIG. 5B also illustrates an exemplary calculation of an application of using the calibrated resistance to monitor cracking, when structural change in region C of the PNC film is reflective of cracks in a host material the sensor is attached to. In this example, a crack length parameter a can be calculated as $a=\text{sqrt}(2R_C/AF \times (R_B+R_D)-1)=\text{sqrt}(R/Ro-1)$.

Figure 6A:
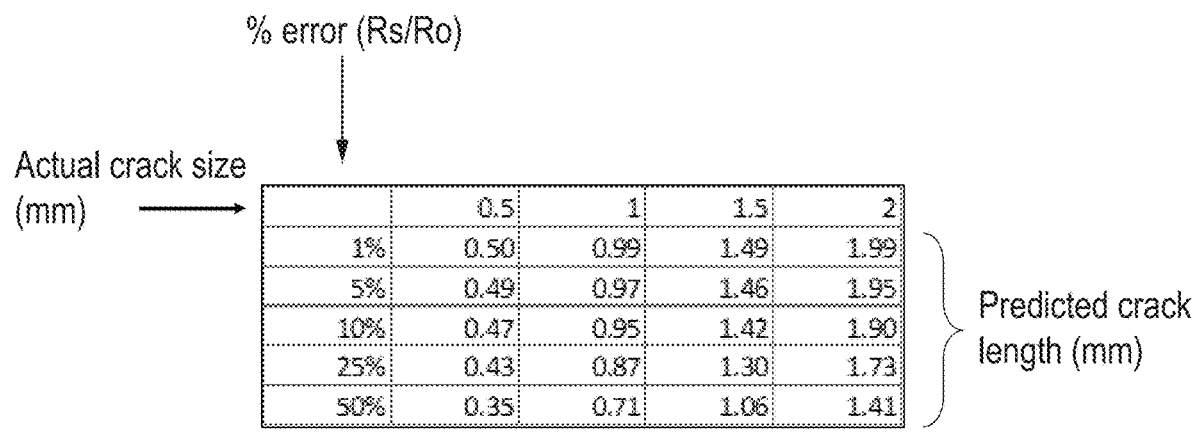
FIG. 6A is a table illustrating predicted crack length as a function of error in a test resistance R for four different given actual crack sizes.

FIG. 6A shows that for a given actual crack size, the higher the % error in R, the more deviation there is between the real crack size and the predicted crack length. As can be seen, for a 1% Rs, there is nearly no deviation, but by 10% the deviation starts to become large and the predicted crack length no longer accurately reflects actual crack length. To a first order, the relative error between predicted crack length and actual crack length is proportional to half of Rs/Ro, so if a parasitic resistance is 10% of the total resistance, there would be a 5% error in predicted crack length.

The predicted crack length values in FIG. 6A are calculated by assuming a 1 kOhm gauge and a 20 mm gain factor (GF), although such sensor configuration is but an example for illustration only and aspects of the present application are not so limited. GF may be defined by $$a = \sqrt{\left(\frac{R}{R_o}-1\right)\left(\frac{2wL}{\pi}\right)} = 16\sqrt{R} = GF\sqrt{\frac{\Delta R}{R}},$$

where GF is the sensor geometry factor, and $\Delta R$ is the difference in measured resistance compared to baseline resistance, or change in resistance. This equation may be used to map $\Delta R/R$ from resistance to crack length. For Example, crack length $$a = 16\sqrt{\frac{\Delta R}{R}}.$$

Figure 6B:
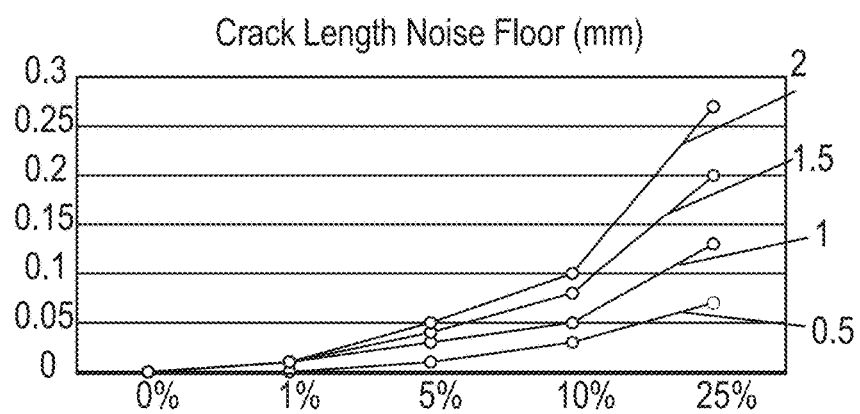
FIG. 6B is a data plot of predicted crack length noise floor in a sensor measurement versus measurement noise in percentage, for the four actual crack size summarized in the table in FIG. 6A.

FIG. 6B is a data plot of predicted crack length noise floor in a sensor measurement versus measurement noise in percentage, for the four actual crack size summarized in the table in FIG. 6A. Measurement noise, or $\Delta R/R$, may represent a relative uncertainty in the measured resistance that introduces a systematic noise or uncertainty in predicted crack length. FIG. 6B illustrates such a correspondence, and shows that for a given actual crack size such as 1 mm, the higher the measurement noise, the higher the noise or uncertainty in the predicted crack length. The crack length noise may be referred to as a noise floor, because the predicted crack length will only be accurate to within a range of the noise floor around a baseline.

It should be appreciated that other forms of determining a and R may also be used. In some embodiments in which region C in FIG. 4A is used as the sensing portion, region D is used as the reference portion, a normalized test resistance R may also be calculated as $$R = \frac{R_C}{R_D} \cdot \frac{R_{D0}}{R_{C0}} - 1,$$

in which $R_C$ and $R_D$ are the contact-resistance-independent resistance of regions C and D, respectively, and $R_{C0}$ and $R_{D0}$ are the baseline resistance for the respective regions. Aspects of the present application may also be applied in other suitable forms to calculate the crack length parameter a based on R. For example, in some embodiments an equation for a is determined empirically. In some embodiments an equation for a comprises one or more polynomials of the normalized test resistance R. For example, empirical analysis of the crack length as a function of R may lead to identification of a polynomial relationship between the two. The identified relationship may be used in subsequent calculations of crack length as a function of R.

Figure 8:
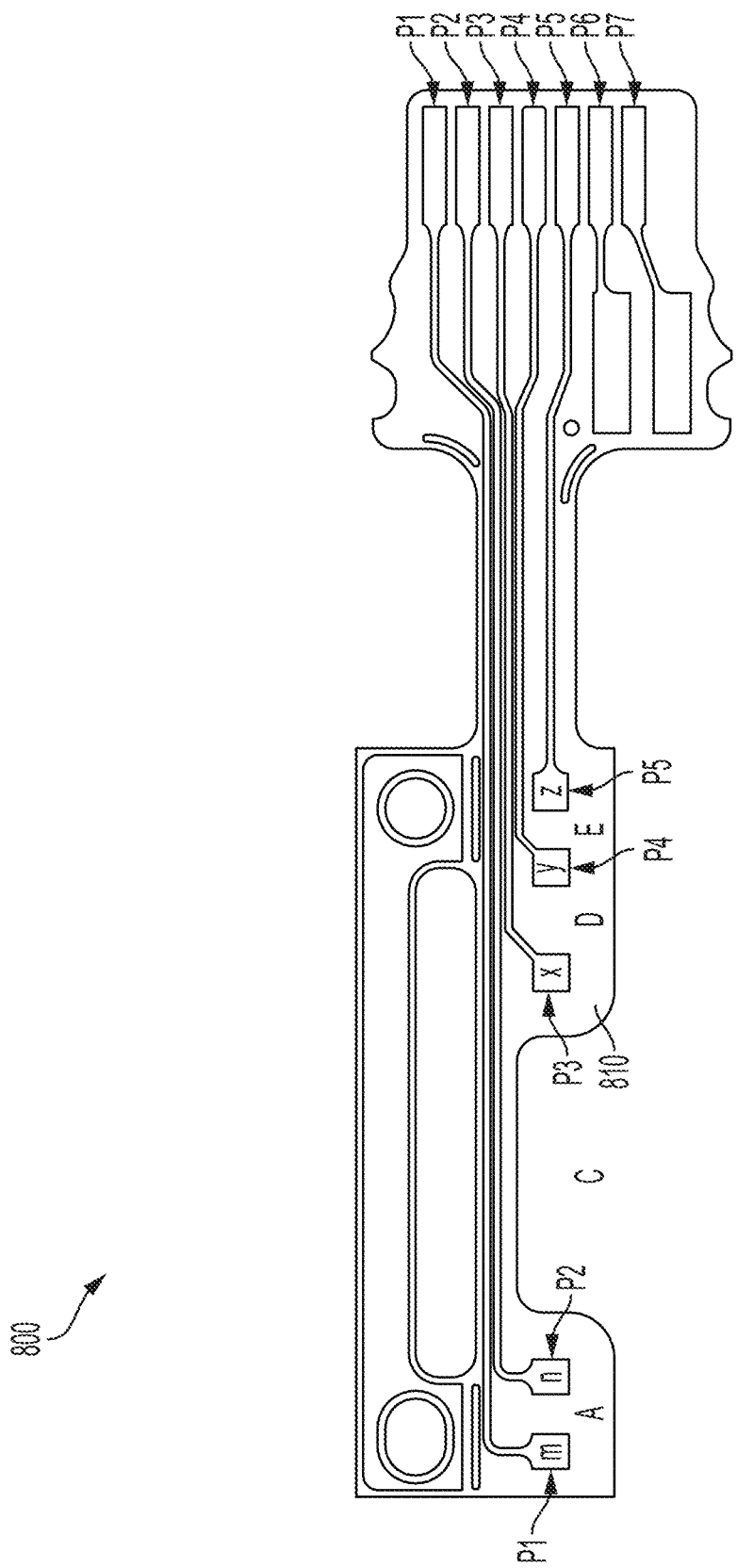
FIG. 8 is a schematic top view diagram of an exemplary PNC sensing element, in accordance with a non-limiting example.

FIG. 8 is a schematic top view diagram of an exemplary PNC sensing element 800, in accordance with a non-limiting example. Sensing element 800 includes five electrodes m, n, x, y, z disposed on a resistive film 810 having regions A, C, D and E, as well as pins P1, P2, ... P7. Pins P1-P5 are electrically connected to respective electrodes m, n, x, y, z for interfacing with a measurement module for measurement of resistances between the electrode pairs, such as measurement module 16 as shown in FIG. 1. Additional pins such as but not limited to P6 and P7 may be used, for example, to interconnect power, ground and/or I/O data between the sensing element 800 and the measurement module 16. In the example in FIG. 8, region C of the resistive film 810 is used as a sensing portion, while region D is used as a reference portion. The methods as discussed in the present application may be used to measure a calibrated resistance of the sensing portion.

Figure 7A:
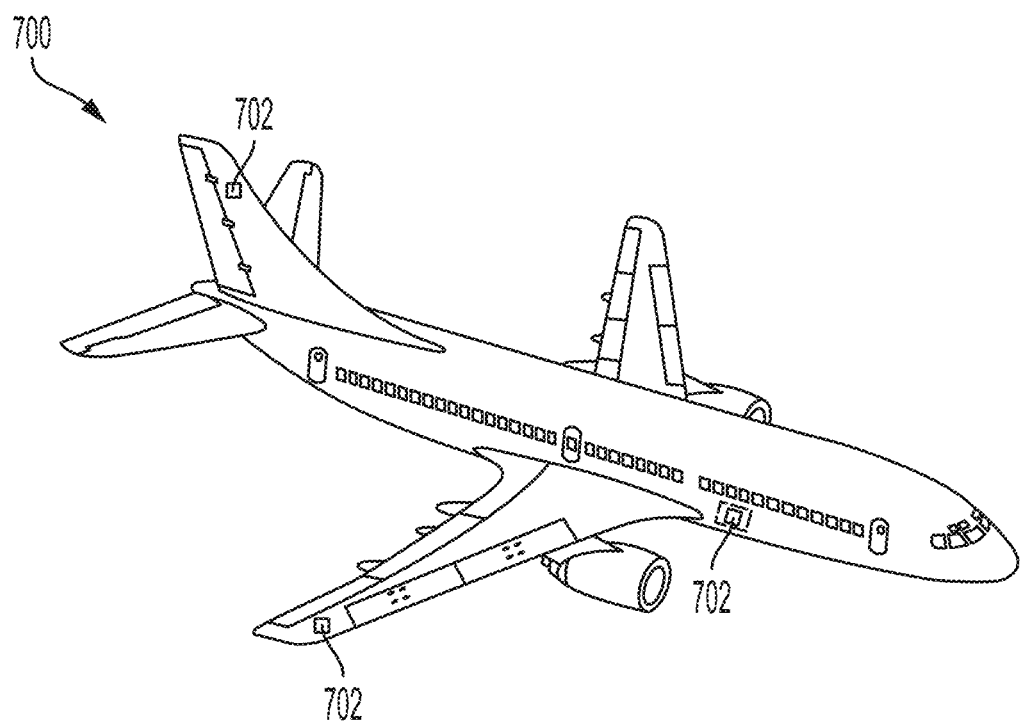
FIGS. 7A and 7B illustrate an exemplary application of the sensors as described herein for aircraft sensing.
Figure 7B:
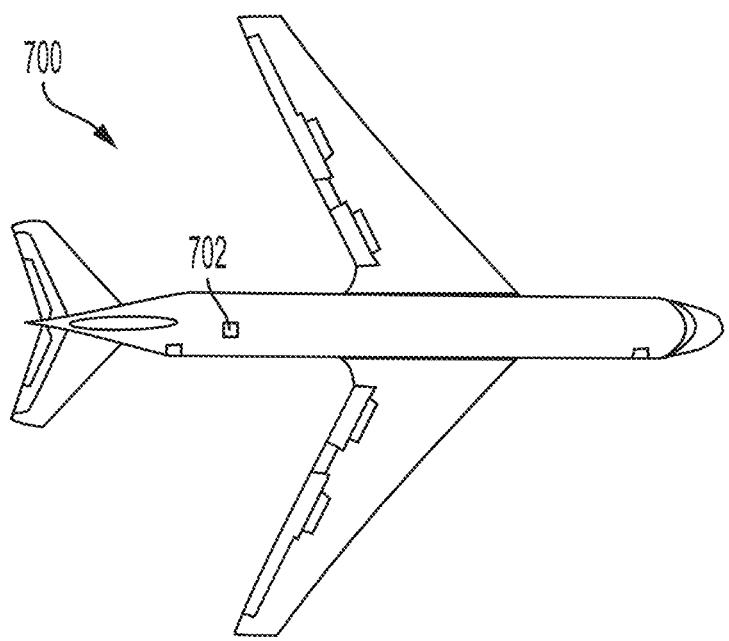

FIGS. 7A and 7B illustrate an exemplary application of the sensors as described herein for aircraft sensing. FIG. 7A illustrates an aircraft 700 and a plurality of sensors 702. FIG. 7A is a perspective view. FIG. 7B is a bottom view of the aircraft.

The illustrated aircraft 700 is an airplane in this non-limiting embodiment. However, other aircraft may use sensors of the types described herein, for structural health monitoring of the aircraft. For example, rockets, space shuttles, drones, gliders, satellites, or other aircraft may make use of the sensors and sensing techniques described herein. Thus, the nature of the aircraft is not limiting.

The sensors 702 may be nanostructure sensors. They may comprise smart sensing materials, such as a nanostructure sensing layer. The nanostructure sensing layer may include a nanostructure material such as carbon nanotubes (CNT). In some embodiments, the nanostructure sensing element may include CNTs embedded in a polymer matrix. The smart sensing material may change in response to a change in condition of the sensed structure, such as the aircraft.

The sensors 702 may sense conditions which represent a permanent change in state of the aircraft. For example, the sensors 702 may be corrosion sensors, configured to sense a state of corrosion of the aircraft. The sensors 702 may be fatigue crack sensors, configured to sense cracking of the aircraft. The aircraft 700 may have multiple types of sensors, such as corrosion sensors and fatigue crack sensors, or other sensors which may operate by experiencing a permanent change in state to mimic a change in state of the monitored aircraft.

The aircraft 700 may include any suitable number of sensors 702. In some embodiments, one or more sensors 702 may be included.

In addition to the foregoing, some novel aspects of the present application are summarized below.

In some embodiments, a sensor is provided that comprises a polymer nano composite (PNC) sensing element and more than two electrical breakout points. The sensor measurements are related to resistance changes of the PNC sensing element, and self-compensation is achieved by taking multiple measurements through various combination of electrical breakout points pairs to account for material and/or manufacturing variability and changes due to mechanical and/or environmental factors such as strain or temperature changes or aging.

In some embodiments, a non-conductive layer is disposed on the bottom surface of the sensor to provide improved electrical isolation from and improved adhesion to a host material or structure. In some embodiments, a non-conductive layer is disposed on the top surface of the sensor to provide improved electrical and contamination isolation from the surrounding environment.

In some embodiments, the resistance measurement is correlated to a physical property of the host material or structure. In some embodiments, the resistance measurement is correlated to the environment of the host material or structure. In some embodiments, the resistance measurement is correlated to the degree of damage, the extent of a flaw or remaining useful life (RUL) of the host material or structure. In some embodiments, the resistance measurement is correlated to the degree of exposure to a corrosive environment. In some embodiments, the resistance measurement is correlated to the length of a crack that has grown in a material.

In some embodiments, a self-compensating Polymer Nano Composite (PNC) sensing element is provided that comprises multiple contacts and multiple PNC regions. The multiple contacts and PNC regions are used to collect various combinations of resistance measurements for the purpose of self-compensation.

In some embodiments, the self-compensation is performed to account for manufacturing variability and changes due to mechanical and/or environmental factors. Such changes may be due to mechanical and/or environmental factors. Such changes may be due to mechanical and/or environmental factors such as any of temperature, strain and or aging.

In some embodiments, some of the PNC region are used to estimate the contact to PNC resistance and other for sensing. In some embodiments, the Polymer Nano Composite regions can be functionalized for different structure health monitoring (SHM) sensing tasks. In some embodiments, the sensing region can be Cu electroplated to create a witness corrosion sensing element. In some embodiments, the sensing region can be left raw or as an exposed PNC material to create a crack sensing element.

In some embodiments, a method for a self-compensating sensor is provided. The sensor comprises a polymer nano composite (PNC) sensing element and more than 2 electrical breakout points. The sensor measurements are related to resistance changes of the PNC sensing element, and by taking multiple measurements through various combination of electrical breakout point pairs a self-compensation can be achieved to account for material and/or manufacturing variability and changes due to mechanical and/or environmental factors such as strain or temperature changes or aging.

In some embodiments, the resistance measurement is correlated to a physical property of the host material or structure. The resistance measurement may be correlated to the degree of damage, the extent of a flaw or remaining useful life (RUL) of the host material or structure, or to the degree of exposure to a corrosive environment.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

The invention claimed is:

1. A self-compensating sensor, comprising:
a sensing element comprising a polymer nano composite (PNC) film;
a plurality of electrical breakout points disposed on the sensing element;
a measurement circuit coupled to the plurality of electrical breakout points and configured to:
  measure a plurality of resistance values between a plurality of pairs of electrical breakout points selected from the plurality of electrical breakout points;
  based on the plurality of resistance values, calculate a first resistance of a sensing portion of the PNC film exposed to an environment;
  based on the plurality of resistance values, calculate a second resistance of a reference portion of the PNC film adjacent the sensing portion; and
  determine a compensated resistance by comparing the first resistance of the sensing portion and the second resistance of the reference portion, wherein the compensated resistance is indicative of a sensed condition of the environment,
wherein
  each of the first resistance and the second resistance is a contact resistance independent resistance, the plurality of electrical breakout points comprise a plurality of linearly arranged electrodes that comprise at least five consecutive electrodes, and
wherein the sensing portion is disposed between a first pair of consecutive electrodes of the plurality of electrodes, the reference portion is disposed between a second pair of consecutive electrodes of the plurality of electrodes, wherein
the first pair of consecutive electrodes are a pair of inner electrodes among four consecutive electrodes of the at least five consecutive electrodes, and the contact-resistance-independent resistance of the sensing portion is calculated based on at least four resistance values measured between at least four pairs of electrodes selected from the four consecutive electrodes.

2. The self-compensating sensor of claim 1, wherein a variation in the contact-resistance independent resistance of the reference portion is compensated in the compensated resistance.

3. The self-compensating sensor of claim 1, wherein the measurement circuit is further configured to calculate the compensated resistance value based on a ratio between the contact-resistance independent resistance of the sensing portion and the contact-resistance-independent resistance of the reference portion.

4. The self-compensating sensor of claim 1, wherein the PNC comprises carbon nanotubes.

5. The self-compensating sensor of claim 1, wherein the sensing element is attached to a structural component, and the sensed condition is an amount of a crack, a state of corrosion, or a state of erosion of the structural component.

6. A method for measuring a sensed condition of an environment using a sensing element that comprises a resistive film and a plurality of linearly arranged electrodes in electrical contact with the resistive film, the method comprising:
measuring a plurality of resistance values between a plurality of pairs of electrodes selected from the plurality of linearly arranged electrodes;
based on the plurality of resistance values, calculating a contact-resistance-independent resistance value of a sensing portion of the resistive film;
based on the plurality of measured resistance values, calculating a contact-resistance-independent resistance value of a reference portion of the resistive film; and
determining a compensated resistance value by combining the resistance value of the sensing portion and the resistance value of the reference portion,
wherein measuring the plurality of resistance values comprising measuring resistance values between a plurality of pairs of electrodes selected from at least five consecutive electrodes of the plurality of linearly arranged electrodes, and
wherein the sensing portion of the resistive film is disposed between a first pair of inner electrodes among four consecutive electrodes of the at least five consecutive electrodes, and calculating the resistance value of the sensing portion comprises calculating based on at least four resistance values measured between at least four pairs of electrodes selected from the four consecutive electrodes.

7. The method of claim 6, wherein the compensated resistance value is indicative of a structural health condition of a structure, and the structural health condition is a degree of damage to the structure.

8. The method of claim 7, further comprising determining a remaining useful life of the structure based on the compensated resistance value.

9. The method of claim 6, wherein determining the compensated resistance value comprises calculating a ratio between the sensed resistance and the resistance value of the reference portion.

10. The method of claim 6, wherein the compensated resistance value is independent of a dimension of the sensing portion, and determining the compensated resistance value comprises normalizing the resistance value of the sensing portion over the dimension of the reference portion.

11. The method of claim 6, wherein the resistive film comprises a polymer nano composite (PNC).

12. The method of claim 6, further comprising exposing the sensing portion of the resistive film to an environment, wherein the compensated resistance value is indicative of a sensed condition of the environment.

13. The method of claim 12, wherein the environment is a corrosive environment.

14. A sensor comprising:
a resistive film having a sensing portion and a reference portion adjacent to the sensing portion;
a plurality of linearly arranged electrodes including a first pair of electrodes contacting the sensing portion and a second pair of electrodes contacting the reference portion;
a measurement circuit coupled to the plurality of linearly arranged electrodes and configured to:
measure a plurality of resistance values between a plurality of pairs of electrodes selected from the plurality of electrodes;
based on the plurality of resistance values, calculate a contact-resistance-independent resistance value of the sensing portion;
based on the plurality of measured resistance values, calculate a contact-resistance-independent resistance value of the reference portion; and
determine a compensated resistance value by combining the resistance value of the sensing portion and the resistance value of the reference portion,
wherein the plurality of linearly arranged electrodes comprise at least five consecutive electrodes, and
wherein the first pair of electrodes are a pair of inner electrodes among four consecutive electrodes of the at least five consecutive electrodes, and the resistance value of the sensing portion is calculated based on at least four resistance values measured between at least four pairs of electrodes selected from the four consecutive electrodes.

15. The sensor of claim 14, wherein the measurement circuit is further configured to calculate the compensated resistance value based on a ratio between the sensed resistance and the resistance value of the reference portion.

16. The sensor of claim 14, wherein the compensated resistance value is independent of a dimension of the sensing portion, and the measurement circuit is further configured to calculate the compensated resistance value by normalizing the resistance value of the sensing portion over the dimension of the reference portion.

17. The sensor of claim 14, wherein the resistive film comprises a polymer nano composite (PNC).

18. The sensor of claim 17, wherein the PNC comprises carbon nanotubes.

19. The sensor of claim 14, wherein the sensing portion of the resistive film is exposed to an environment, and the compensated resistance value is indicative of a sensed condition of the environment.

20. The sensor of claim 19, wherein the resistive film is attached to a structural component, and the sensed condition is an amount of a crack, a state of corrosion, or a state of erosion of the structural component.

* * * * *